(12) United States Patent
Ito et al.

(10) Patent No.: US 6,457,732 B2
(45) Date of Patent: Oct. 1, 2002

(54) FRONT SUSPENSION STRUCTURE

(75) Inventors: Shinji Ito; Toshiyuki Iwai, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/783,095

(22) Filed: Feb. 15, 2001

(30) Foreign Application Priority Data

Feb. 15, 2000 (JP) ........................................ 2000-036057

(51) Int. Cl.[7] ................................................ B62K 25/24
(52) U.S. Cl. ........................................ 280/277; 180/219
(58) Field of Search ................................ 280/276, 277, 280/279, 283; 180/219

(56) References Cited

U.S. PATENT DOCUMENTS 4,406,475 A * 9/1983 Miyakoshi et al. ......... 180/229
4,775,163 A * 10/1988 McGowan et al. ......... 280/277
6,155,370 A * 12/2000 Iwai et al. .................. 180/219
6,164,675 A * 12/2000 Pickering .................... 180/219

FOREIGN PATENT DOCUMENTS

JP          59-20784        2/1984
WO       WO 8701670 A1 *   3/1987 ........... B62K/25/08

* cited by examiner

Primary Examiner—Kevin Hurley
(74) Attorney, Agent, or Firm—Birch, Stewart, Kolasch & Birch, LLP

(57) ABSTRACT

An attachment stay is fixed to corresponding fork pipes, a shaft is inserted between through holes of respective attachment stays, one end of a cushion arm is rotatably supported on the shaft via a ball bearing and a needle bearing, and a lower end of a shock absorber is rotatably attached to a middle section of the cushion arm to provide a front suspension structure offering a high degree of freedom during assembly of the cushion arm.

14 Claims, 4 Drawing Sheets

FRONT SUSPENSION STRUCTURE

BACKGROUND OF THE INVENTION

1. Field of the Invention

The present invention relates to a front suspension structure of a motorcycle, more particularly to a front suspension structure having a shock absorber and a front fork provided as separate components.

2. Background Art

Japanese Patent Laid-open No. Sho. 59-20784 discloses a motorcycle link-type front suspension structure of the related art having a shock absorber that is not assembled inside a front fork, but is instead arranged separately and independently from a front fork. The disclosed front suspension structure has a swing arm (axle support arm) provided so as to bridge between a lower end of a front fork and an axle, a lower end of a cushion arm linked to the middle of the swing arm, an upper end of the cushion arm linked to a lower end of the shock absorber, and an upper end of the shock absorber linked to a top bridge.

With these types of front suspension structures, vibration of the swing arm during travel is conveyed to the shock absorber through the cushion arm, and a specified buffering action is exhibited. The lower end of the cushion arm is directly attached to the front fork in the above-described technique of the related art. Also, the upper end of the cushion arm is attached to the front fork via a tension rod.

However, the front fork and the cushion arm are manufactured separately, and it is inevitable that a distance between left and right fork pipes will vary as each manufactured component will exhibit varying design values. Accordingly, the extent to which left and right fork pipes constituting the front fork are parallel, and the position of the top bridge and a bottom bridge etc. will be slightly different as the actual manufactured values for each manufactured component will vary from desired design parameters.

The method of attaching the cushion arm of this type of conventional structure to a front fork involves fixing a bracket to the front fork and linking the cushion arm to this bracket at specified locations. Unfortunately, the distance and degree of parallelism between the fork pipes is slightly different for each manufactured component, thereby making it difficult to obtain lateral positional precision and parallel positional precision for the installation and positioning of the cushion arm.

SUMMARY OF THE INVENTION

The present invention overcomes the shortcomings associated with the related art and achieves other advantages not realized by the related art.

An object of the present invention is to improve the installation of cushion arms in front suspension structures by improving the lateral positioning precision and parallel precision of installed components.

A further object of the present invention is to provide a front suspension structure that offers simple and reliable positional adjustment of front suspension components, including stays and cushion arms.

A further object of the present invention is to reduce friction as a result of shock absorbing motion being conveyed between components of a front suspension structure.

These and other objects are accomplished by a front suspension structure comprising a front fork having right and left fork pipes, a cushion arm attachment stay attached to each of the right and left fork pipes, a cushion arm for oscillating in response to a vertical motion transmitted from the front fork, a top bridge and a bottom bridge, and a shock absorber, wherein the front fork and the shock absorber are separate components with an upper end of the shock absorber linked to a top bridge side, and a lower end of the shock absorber linked to the cushion arm, the cushion arm swingably supported between the cushion arm attachment stays via a shaft.

These and other objects are accomplished by a front suspension support structure connected to a steering system of a motorcycle, the front suspension structure comprising a top bridge attached to an upper end of the steering system, a bottom bridge attached to a lower end of the steering system, an upper part of a front fork supported by the top bridge and the bottom bridge, and a lower end of the front fork is connected to an arm holder, a first end of an axle support arm is swingably attached to an axle of a front wheel of the motorcycle, cushion arm attachment stays attached to the front fork, and a cushion arm, swingably supported between the cushion arm attachment stays and linking a lower end of a shock absorber via a shaft.

In order to make it possible to positionally adjust the stays attached to each of the left and right fork pipes in an axial direction of the fork pipes and around the fork pipes, the attachment position and attachment direction of the stay relative to the cushion arm is adjusted, and the lateral positioning precision and parallel precision can be improved. According to a preferred embodiment of the present invention, positional adjustment can be accomplished through the simple adjustment of a few securing bolts.

Furthermore, by using a divided structure for the cushion arm attachment stays, positional adjustment can be carried out easily.

Further scope of applicability of the present invention will become apparent from the detailed description given hereinafter. However, it should be understood that the detailed description and specific examples, while indicating preferred embodiments of the invention, are give by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
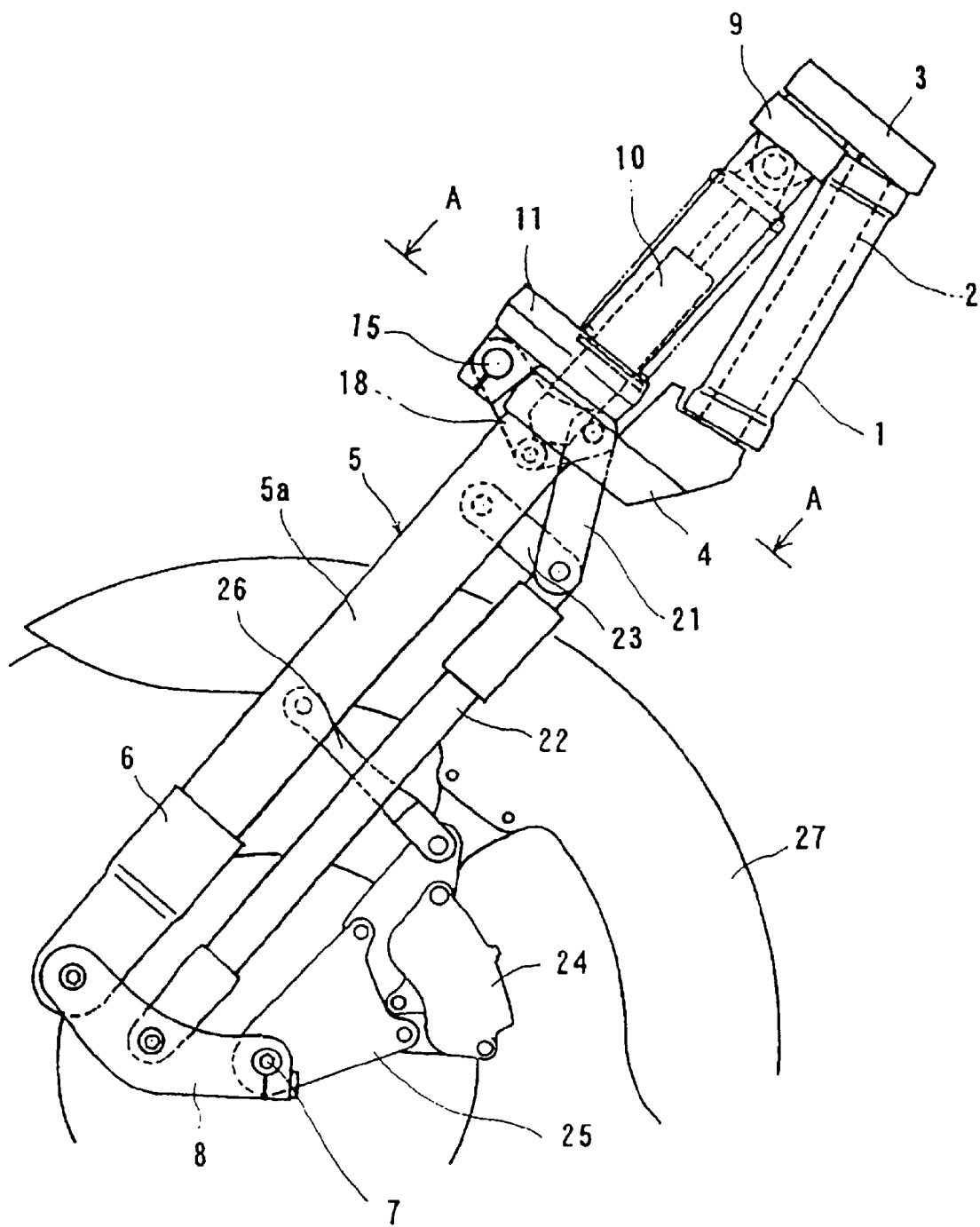
FIG. 1 is a side elevation view of a front suspension structure according to an embodiment of the present invention.
Figure 2:
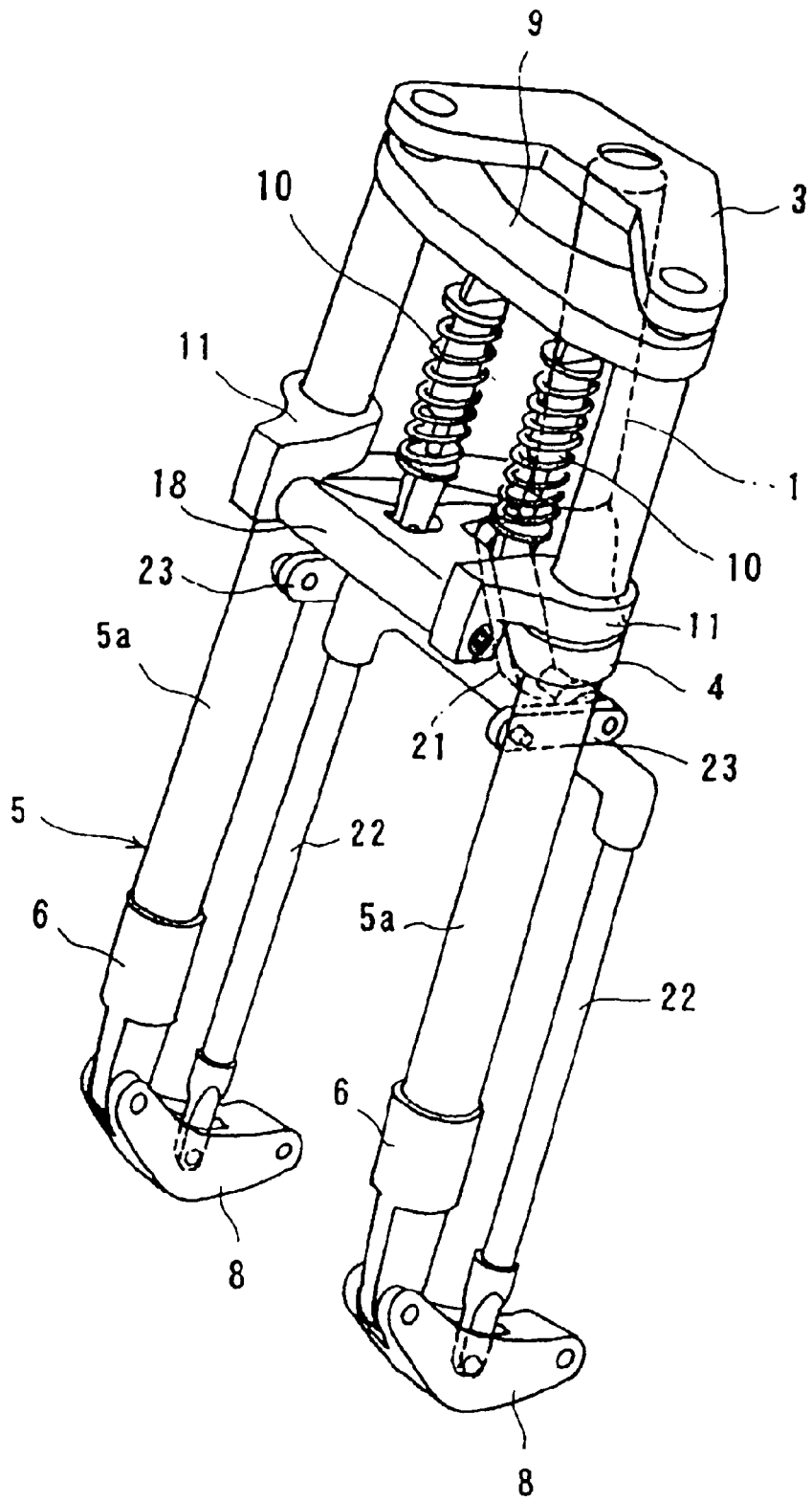
FIG. 2 is a perspective view of the front suspension structure according to an embodiment of the present invention.
Figure 3:
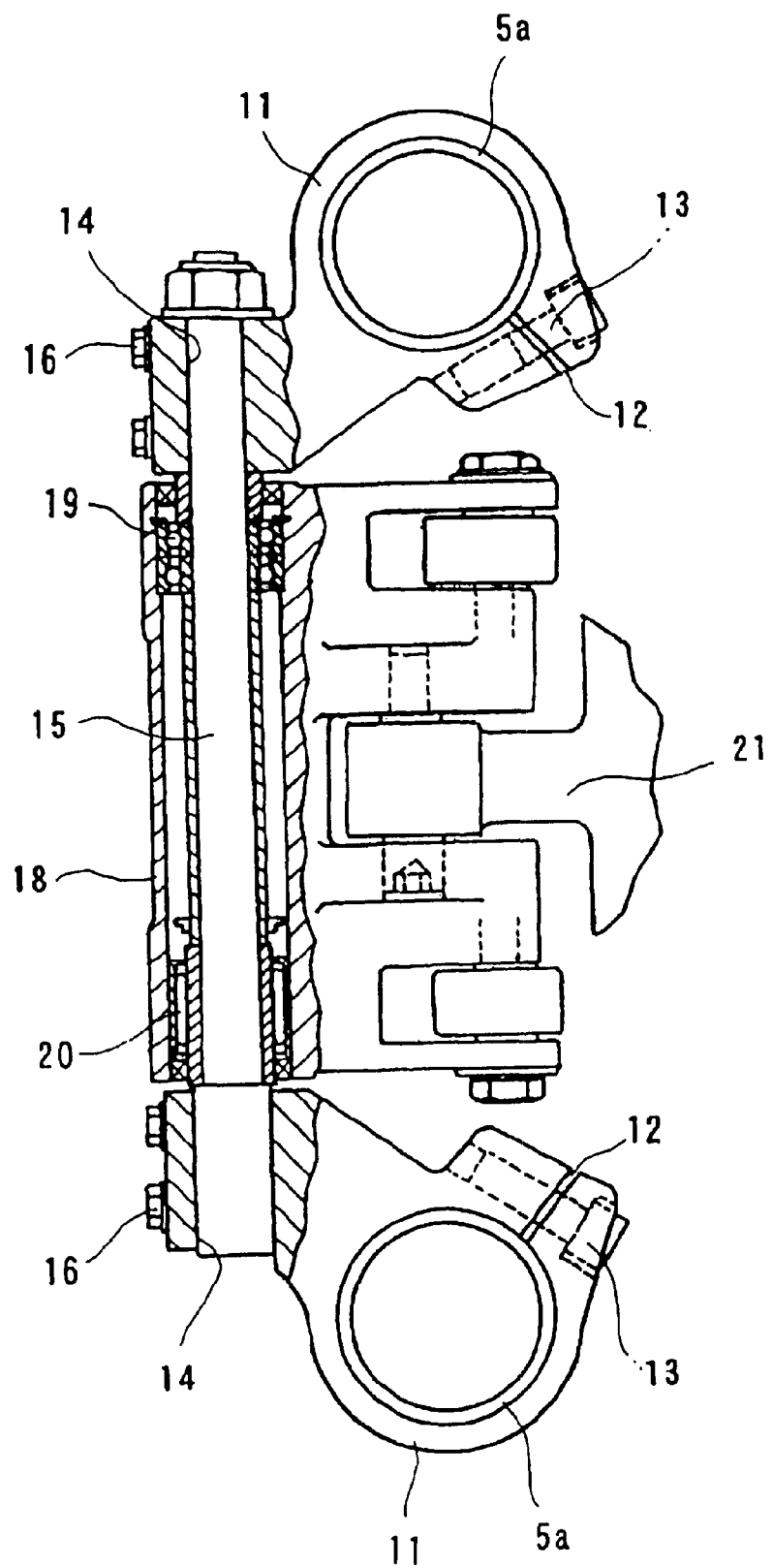
FIG. 3 is a cross sectional view of the front suspension structure according to an embodiment of the present invention taken along line A—A in FIG. 1.
Figure 4:
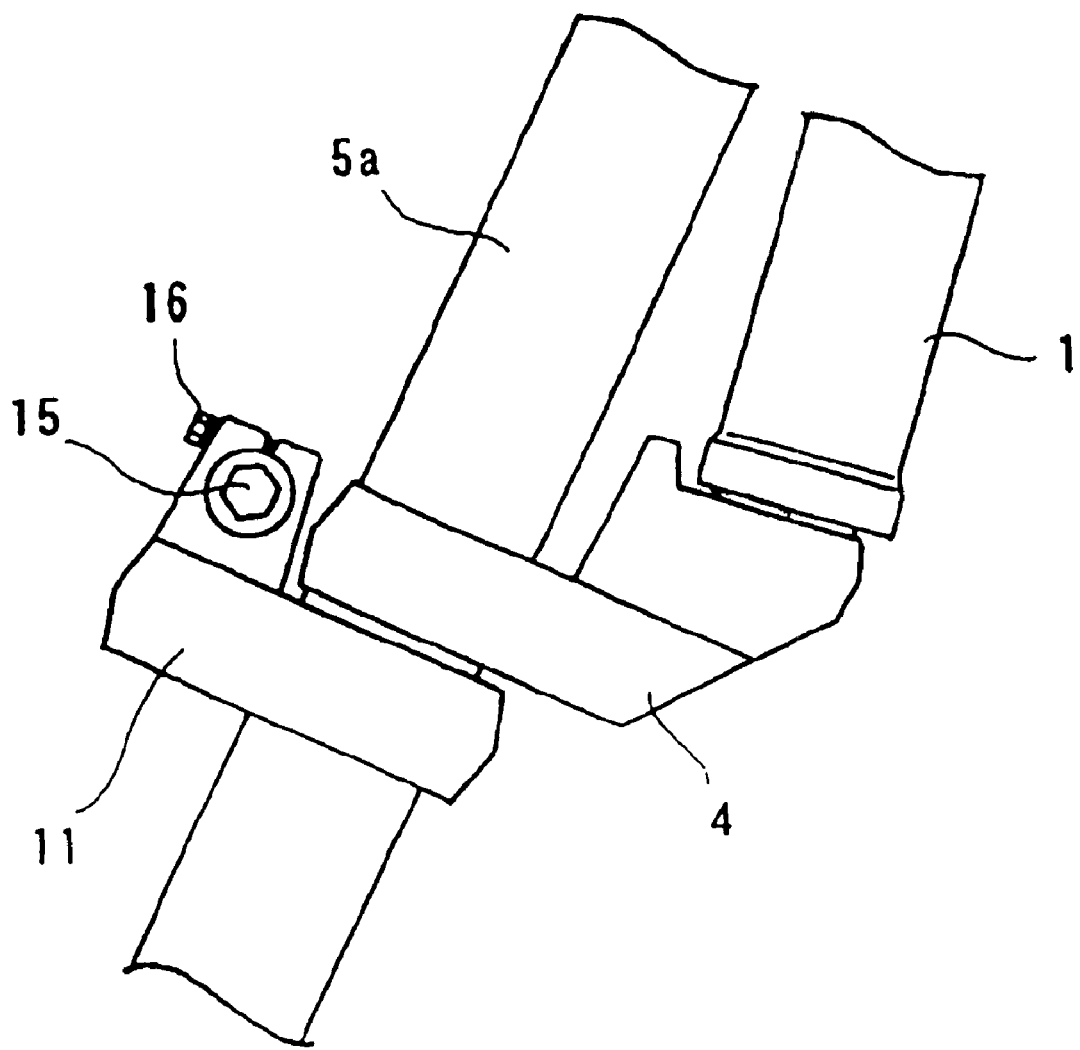
FIG. 4 is a side elevation view of a front suspension structure according to a further embodiment of the present invention.

Hereinafter, the present invention will be described in detail with reference to the accompanying drawings. FIG. 1 is a side elevation view of a front suspension structure according to an embodiment of the present invention. FIG. 2 is a perspective view of the front suspension structure according to an embodiment of the present invention. FIG. 3 is a cross sectional view of the front suspension structure according to an embodiment of the present invention taken along line A—A in FIG. 1. FIG. 4 is a side elevation view of a front suspension structure according to a further embodiment of the present invention.

FIG. 1 is a side elevation view of a front suspension structure according to an embodiment of the present invention. As shown in FIG. 1, a steering system 2 is inserted into a headpipe 1 so as to be capable of rotation, with a top bridge 3 being attached to an upper end of the steering system 2 and a bottom bridge 4 being attached to a lower end of the steering system 2. An upper part of a front fork 5 is supported by the top bridge 3 and bottom bridge 4, and a lower end of the front fork 5 is inserted into an arm holder 6.

A first end of an axle support arm (pivot arm) 8 is swingably attached to an axle 7 of a front wheel of a motorcycle. The shape of this axle support arm 8 is substantially V-shaped when viewed from the side, and a second end of the axle support arm 8 rotatably hinges at a lower end of the arm holder 6.

An upper end of a shock absorber 10 is rotatably attached to the top bridge through an attachment stay 9. Cushion arm attachment stays 11, 11 are fixed to left and right fork pipes 5a, 5a constituting the front fork 5 so as to overlap on the bottom bridge 4.

A slot 12 is formed in a part of each attachment stay for gripping the fork pipe 5a, and the attachment stays 11 are secured to the fork pipes 5a by screwing in bolts 13 to a desired tightness. Further, it is possible to adjust the attachment position of the attachment stay 11 in the axial direction of the fork pipe 5a by loosening the bolts. Accordingly, the attachment direction in a peripheral direction of the fork pipes 5a can also be adjusted.

A through hole 14 and a slot are formed in a projecting portion of each attachment stay 11. A bolt shaft 15 is passed between the through holes 14, and the shaft 15 is fixed between the attachment stays 11, 11 by tightening with bolts 16.

A first end of a cushion arm 18 is rotatably supported on the shaft 15 via a ball bearing 19 and a needle bearing 20. A lower end of the shock absorber 10 is rotatably attached to a middle section of the cushion arm 18.

An upper end of a connecting member 21 is rotatably linked to an other end of the cushion arm 18. An upper end of a push rod 22 is rotatably linked to a lower end of the connecting member 21, and a lower end of the push rod 22 is rotatably linked to a middle section of the axle support arm 8.

Accordingly, an upper arm 23 is rotatably suspended between the upper end of the push rod 22 and the front fork 5, and a quadrilateral link is formed by the upper arm 23, fork pipes 5a, push rod 22 and the axle support arm 8.

Further, one end of an attachment stay 25 for a brake caliper 24 is attached to the front wheel axle 7. A torque link 26 is suspended between an other end of the attachment stay 25 and the front fork 5, and a fender 27 is attached to the attachment stay 25.

In the above-described structure, if the wheel is moved up and down due to unevenness on the road, the axle support arm 8 vibrates up and down. The energy from this vibration is conveyed to the cushion arm 18, and the shock absorber 10 expands and contracts due to the vibration of the cushion arm 18 to exert a shock absorbing effect or dampening effect.

FIG. 4 is a side elevation view of a front suspension structure according to a further embodiment of the present invention. As seen in FIG. 4, an attachment stay 11 is fixed to a lower side of the bottom bridge 4. By fixing an attachment stay 11 to each fork pipe 5a with this type of arrangement, similar effects and advantages as described above can be achieved.

In all of the embodiments, a cushion arm 18 is swingably supported by a shaft 17 through a ball bearing 19 and a needle bearing 20. However, this is not a necessary limitation as long as a bearing is at least used to provide swingable support of the cushion arm 18.

According to the invention described hereinabove, a stay 9 is attached to each of the left and right fork pipes 5a constituting a front fork 5, and a cushion arm 18 linking a lower end of a shock absorber 10 via a shaft 17 is swingably supported between these stays 19. Accordingly, it is possible to improve lateral positioning precision and ensure a parallel arrangement between adjacent components by adjusting the attachment positions and attachment directions of the stays. In addition, friction resulting from typical vibration in conventional structural arrangements is drastically reduced through the present invention.

Also, since it is possible to alter the position of the stays in an axial direction of the front fork, it is easy to carry out alteration of the link ratio specifications as desired by an operator or technician.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front suspension structure comprising:
   a front fork having right and left fork pipes;
   a cushion arm attachment stay attached to each of said right and left fork pipes;
   a cushion arm for oscillating in response to a vertical motion transmitted from said front fork, wherein a slot is formed in a portion of each cushion arm attachment stay for gripping the respective fork pipe;
   a top bridge and a bottom bridge; and
   a shock absorber, wherein said front fork and said shock absorber are separate components with an upper end of the shock absorber linked to said top bridge, and a lower end of the shock absorber linked to said cushion arm, the cushion arm swingably supported between said cushion arm attachment stays via a shaft.

2. The front suspension structure according to claim 1, wherein the upper end of the shock absorber is rotatably attached to the top bridge through an attachment stay.

3. The front suspension structure according to claim 1, wherein each cushion arm attachment stay is fixed to respective left and right fork pipes so as to overlap on the bottom bridge.

4. The front suspension structure according to claim 1, wherein each cushion arm attachment stay is fixed to a lower side of the bottom bridge.

5. The front suspension structure according to claim 1, wherein each cushion arm attachment stay is secured to each fork pipe by securing bolts passing through said slot to a desired tightness.

6. The front suspension structure according to claim 1, wherein a through hole and said slot are formed in a projecting portion of each cushion arm attachment stay.

7. The front suspension structure according to claim 6, wherein a bolt shaft is passed between each through hole, and the bolt shaft is fixed between the cushion arm attachment stays by securing with bolts.

8. The front suspension structure according to claim 1 further comprising:
   a first end of a cushion arm rotatably supported on a bolt shaft via a ball bearing and a needle bearing.

9. The front suspension structure according to claim 7 further comprising:
   a first end of a cushion arm rotatably supported on a bolt shaft via a ball bearing and a needle bearing.

10. A front suspension structure comprising:
    a front fork having right and left fork pipes;
    a cushion arm attachment stay attached to each of said right and left fork pipes;
    a cushion arm for oscillating in response to a vertical motion transmitted from said front fork, a first end of said cushion arm rotatably supported on a bolt shaft via a ball bearing and a needle bearing;
    a top bridge and a bottom bridge; and
    a shock absorber, wherein said front fork and said shock absorber are separate components with an upper end of the shock absorber linked to said top bridge, and a lower end of the shock absorber linked to said cushion arm, the cushion arm swingably supported between said cushion arm attachment stays via a shaft, and wherein a lower end of the shock absorber is rotatably attached to a middle section of the cushion arm and an upper end of a connecting member is rotatably linked to an other end of the cushion arm.

11. The front suspension structure according to claim 10 further comprising:
    an upper end of a push rod rotatably linked to a lower end of the connecting member; and
    a lower end of the push rod is rotatably linked to a middle section of angle support arm.

12. The front suspension structure according to claim 11, wherein an upper arm is rotatably suspended between the upper end of the push rod and the front fork, and a quadrilateral link is formed by the upper arm, right and left fork pipes, push rod and the axle support arm.

13. The front suspension structure according to claim 12, further comprising:
    an attachment stay for a brake caliper is attached to a front wheel axle;
    a torque link suspended between an other end of said attachment stay for said brake caliper and the front fork; and
    a fender attached to said attachment stay for said brake caliper.

14. A front suspension structure comprising:
    a front fork having right and left fork pipes;
    a cushion arm attachment stay attached to each of said right and left fork pipes; wherein said cushion arm attachment stays have a divided, two-part structure,
    a cushion arm for oscillating in response to a vertical motion transmitted from said front fork, wherein a slot is formed in a portion of each cushion arm attachment stay for gripping the respective fork pipe;
    a top bridge and a bottom bridge; and
    a shock absorber, wherein said front fork and said shock absorber are separate components with an upper end of the shock absorber linked to said top bridge, and a lower end of the shock absorber linked to said cushion arm, the cushion arm swingably supported between said cushion arm attachment stays via a shaft.

* * * * *